US007800875B2

(12) United States Patent
Flay et al.

(10) Patent No.: US 7,800,875 B2
(45) Date of Patent: Sep. 21, 2010

(54) MULTI-LEVEL ELECTRONIC PROTECTION SYSTEM PROVIDING SAFE FAULT RECOVERY FOR MULTIPLE DIGITAL CONTROL OUTPUTS

(76) Inventors: Dustin Flay, 66 Jennifer Dr., Chester Springs, PA (US) 19425; Charles L. Martin, 403 Wood Dr., Blue Bell, PA (US) 19422-2424; Sunil M. Ingawale, Flat No. 304, V.S. Paradise, S.G. Palya, CV Raman Nagar, Bangalore, Karmataka 560093 (IN)

( * ) Notice: Subject to any disclaimer, the term of this patent is extended or adjusted under 35 U.S.C. 154(b) by 642 days.

(21) Appl. No.: 11/778,296

(22) Filed: Jul. 16, 2007

(65) Prior Publication Data
US 2009/0021880 A1 Jan. 22, 2009

(51) Int. Cl.
*H02H 3/00* (2006.01)
(52) U.S. Cl. .................... 361/64; 361/93.1; 361/100
(58) Field of Classification Search ............ 361/62–66, 361/93.1, 93.2, 93.4, 100, 101
See application file for complete search history.

(56) References Cited

U.S. PATENT DOCUMENTS 3,678,291 A * 7/1972 Coe .......................... 361/101
5,905,615 A * 5/1999 Rivetti et al. .................. 361/63

OTHER PUBLICATIONS

"VN808 Octoal Channel High Side Driver", VN808 Datasheet, STMicroelectronics, 2002, 12 pages.

* cited by examiner

*Primary Examiner*—Jared J Fureman
*Assistant Examiner*—Terrence R Willoughby
(74) *Attorney, Agent, or Firm*—Jetter & Associates, P.A.

(57) ABSTRACT

An over-current electronic protection system includes a first solid state reversibly interruptible electronic switch including first output control logic and first controlled output channels controlled by the first control logic. The first output control logic reversibly interrupts power at any output channel when their current exceed limits. The system includes a second solid state reversibly interruptible electronic switch including second control logic and second controlled outputs. A power supply input of the second switch is coupled to one of the first controlled output channels to receive the power. The second controlled outputs provide power to loads under normal operating conditions and reversibly interrupt the power for second output channels when their current exceeds limits. A CPU having is coupled to the second output channels and external inputs of the second switches via an isolation device to provide a supervisory and monitoring function.

14 Claims, 2 Drawing Sheets

MULTI-LEVEL ELECTRONIC PROTECTION SYSTEM PROVIDING SAFE FAULT RECOVERY FOR MULTIPLE DIGITAL CONTROL OUTPUTS

FIELD OF THE INVENTION

The present invention relates to electronic circuit protection systems which protect multiple digital control outputs, such as outputs associated with an industrial process, from short circuits or other potentially destructive conditions.

BACKGROUND

In a process control system, a process is controlled which generally involves the monitoring and controlling of fluid flow, fluid flow rate, fluid levels, temperature, pressure, position, or levels (e.g. tank or vat levels). These parameters are resultants of a process and are measured by a variety of field devices including devices such as valves, flow meters, position indicators, and motors. As the process continues, the measured parameters are generally monitored by a CPU-based main controller, and output signals are generated for controlling the various field devices (or field equipment) or interposing control relays that connect to the field devices. In the event of a failure in the system, there is a need to provide short circuit and/or over current protection for any of the multiple digital control outputs without operator intervention. The protection should be achieved in a non-destructive manner such that once the fault condition has been detected and subsequently corrected no further maintenance (e.g. fuse replacement) is required.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A multi-level over-current electronic protection system for protecting a plurality of outputs includes a first solid state reversibly interruptible electronic switch including first output control logic and a plurality of first controlled output channels controlled by the first control logic. The first switching device is coupled to receive power from at least one power supply selected to power a plurality of loads. The first switching device provides power at its plurality of first output channels under normal operating conditions, wherein the first output control logic is operable for reversibly interrupting power at any of the first output channels when current in any of the first output channels exceed limits for the first output channels. At least one second solid state reversibly interruptible electronic switch including second control logic and a plurality of second controlled outputs control by the second control logic is also provided. A power supply input of the second switch is coupled to one of the plurality of first controlled output channels to receive the power, wherein the second controlled outputs are coupled to provide the power to the plurality of loads under normal operating conditions and reversibly interrupting the power for any of the second output channels when current in any of said second output channels exceeds limits for the second output channels.

In one embodiment, the second control logic includes an internal control input related to a current level in each of second output channels. The second control logic can further comprise external control inputs associated with each the second output channels. The second output channels can be are independently interruptible.

The first control logic can include an internal control input related to a current level in each of the first output channels, and the first output channels can be independently interruptible. The second switch can comprise a plurality of said second switches.

In a preferred embodiment, the system further comprises an isolation device and CPU having associated firmware coupled to the second output channels and the external inputs of the second switches via the isolation device. In this embodiment, the isolation device can comprise a multi-channel optocoupler. The CPU can includes a plurality of status registers. One of the status registers can be associated with each of the plurality of second output channels. In one embodiment, the firmware is operable for monitoring a state of each of the plurality of second output channels, wherein the firmware compares a state of each of the plurality of second controlled outputs to at least one predetermined reference level and causes the status registers to provides a turn off signal to the external inputs of the second switching device to disable any of said second output channels responsive to a determination of a faulted output by said firmware. This arrangement can eliminate oscillation of outputs between being ON and OFF that can otherwise occur. In one embodiment, the current limits for each of the first output channels is greater than the current limits for groups of the second output channels associated with each of the first output channels.

A method of providing multi-level over-current electronic protection to protect a plurality of outputs, comprises the steps of providing an electron protection system comprising a first solid state reversibly interruptible electronic switch for receiving power from a power supply having first control logic associated with a plurality of first controlled output channels in series with at least one second solid state reversibly interruptible electronic switch having second control logic associated with a plurality of second controlled output channels, wherein a power supply input of the second switch is coupled to one of the plurality of first controlled output channels to receive the power. A plurality of field loads are connected to the plurality of second controlled output channels to provide power during operation of the field loads. Power to the fields loads are interrupted when current in any of second controlled output channels associated with said loads is above a set limit. In one embodiment, the first and second output channels are independently interruptible. In a preferred embodiment, the protection system further comprises a CPU having associated firmware, wherein the method further comprising the steps of feeding back a readback signal from the plurality of second output channels to said CPU, determining an over current status in any one of the second output channels using the firmware, and causing the said second output channel which reached the over current status to remain OFF, wherein the second output channel(s) which reached the over current status remaining OFF until cleared by an operator of the system. The CPU can include a plurality of status registers, wherein the firmware determines a state of the registers, and one of the plurality of status registers is associated with each of the plurality of second output channels. The determining step can comprise the firmware comparing a state of each of the plurality of second controlled outputs to at least one predetermined reference level and providing a turn off signal using the registers to external inputs of the second switching device to disable any of the second output channels responsive to a determination of a faulted output by the firmware.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION

This present invention provides multi-level short circuit and/or over current protection for a plurality of digital control outputs (DOs) without the need for operator intervention. The protection is configured to be channel independent, such that a fault in one output channel does affect the other channels. The protection is provided by solid state reversibly interruptible electronic switching devices which provide "reversibly interruptible" performance, defined herein as a sensing arrangement or mechanism (unlike a conventional fuse) that interrupts power and automatically permits a return to normal service once the fault is no longer present. Thus, once the fault condition has been detected and subsequently corrected, no further maintenance (e.g. fuse replacement) is required. In a preferred embodiment, the system includes a CPU or other processor having embedded firmware which performs a supervisory function as described below.

Figure 1:
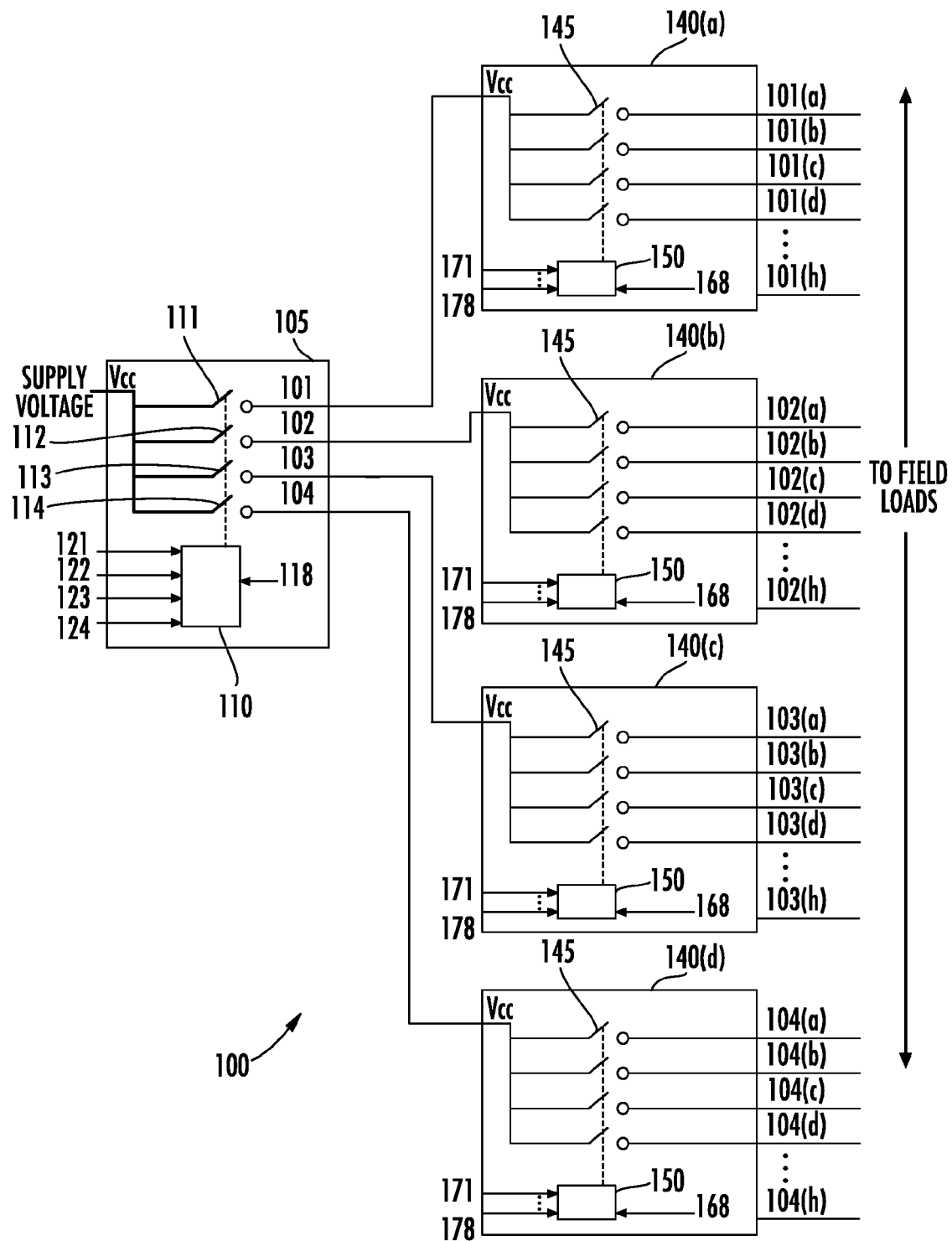
FIG. 1 is a simplified block diagram for a multi-level short circuit and/or over-current protection system for protecting a plurality of digital control outputs.

FIG. 1 shows a simplified block diagram for a multi-level short circuit and/or over current protection system 100 for protecting a plurality of digital control outputs. System 100 includes a first solid state electronic switching device 105 which includes first output control logic 110 arranged for active current limiting a plurality of first controlled output channels, shown as being four (4) channels 101-104. The first switching device 105 is coupled to receive at least one supply voltage (shown as "supply voltage"), such as a 24 volt dc supply (e.g. at its Vcc pin), which is generally selected to be at a high enough level to provide a voltage level sufficient to power the highest voltage required by the plurality of field loads which are coupled to the system 100.

The first switching device 105 includes first output control logic 110 which controls the state (ON/OFF) of switches 111-114 associated with channels 101-104, respectively. Control logic 110 includes an internal control input 118 that is related to current in each of the channels, such as junction temperature. Control logic 110 also includes external control inputs 121-124 associated with each of its channels 101-104. Under normal operating conditions, first control logic 110 permits the switches 111-114 to all be closed, allowing the power supply voltage to be provided output channels 101-104. However, upon sensing a fault condition, for example, current supplied being above a predetermined limit in any of the channels due to a short to ground in one of the field loads, via signaling from either of the control inputs (118 or 121-124), first output control logic 110 is operable for opening any of the switches 111-114 to interrupt the power supply voltage at any of the output channels 101-104. Following a fault, when the current drops below the predetermined level, the control logic 110 preferably has an automatic restart feature which automatically permits the switch associated with the earlier faulted channel to close, so that the associated output can automatically return to its normal state so that it can again provide power to service the load.

System 100 also includes a plurality of second solid state electronic switching devices 140(*a*), (*b*), (*c*) and (*d*), for providing a second level of active current limiting. Switching devices 140(*a*)-(*d*) each being shown providing eight (8) second controlled outputs, 101(*a*)-(*h*), 102(*a*)-(*h*), 103(*a*)-(*h*), and 104(*a*)-(*h*). Switching devices 140(*a*)-(*d*) include second output control logic 150 which together with switches 145 are arranged for active current limiting the plurality of second controlled outputs. Control logic 150 includes an internal control input 168 that is related to current in each of its channels, such as junction temperature. Control logic 150 also includes external control inputs 171-178 associated with each of its channels 101-104. Each second controlled output, 101(*a*)-(*h*), 102(*a*)-(*h*), 103(*a*)-(*h*), and 104(*a*)-(*h*) is generally coupled to a different field load. The second solid state electronic switching devices 140(*a*)-(*d*) have their power supply inputs (Vcc) coupled to output channels 101-104 of first switching device 105, respectively. Thus, second solid state electronic switching devices 140(*a*) receives its power supply (Vcc) input from output 101 of first solid state electronic switching device 105. First switching device 105 thus detects whether the overall current load for a group of outputs (e.g. 101(*a*)-(*h*)) has exceeded desired limits, for each of its output channels 101-104. Under these conditions, the power to an entire group of outputs can be automatically temporarily interrupted until the fault(s) is corrected.

As noted above, outputs 101(*a*)-(*h*), 102(*a*)-(*h*), 103(*a*)-(*h*), and 104(*a*)-(*h*) are all also protected by second control logic 150, which is operable to open respective switches 145 associated with each of the output channels 101(*a*)-(*h*), 102(*a*)-(*h*), 103(*a*)-(*h*), and 104(*a*)-(*h*) upon detection of a fault condition, such as current above a predetermined limit by control input 168, and/or via control inputs 171-178. As with first switching device 105, following a fault, when the current drops below the predetermined level, the control logic 150 associated with second switching devices 140(*a*)-(*d*) preferably has an automatic restart feature which automatically permits any of the switches 145 associated with the earlier faulted channel to close, so that the associated output can automatically return to providing the power supply level provided to the particular field load prior to the fault.

In one embodiment, the first switching device 105 is embodied as VNQ05XSP16™ quad channel high-side driver from STM Microelectronics NV, Geneva, Switzerland, or its functional equivalent. The VNQ05XSP16™ is a single chip (monolithic) IC that provides active current limitation combined with thermal shutdown and automatic restart, which protects the device against overload active current. In the overload condition, its channels turn OFF and back ON automatically so as to maintain junction temperature between a range of temperature values. The range of temperatures correspond to current levels in the channels. Each individual switch of VNQ05XSP16™ is independently current limited to about 5 to 7.5 A. The channel switches of the quad device are truly independent such that an over-current condition in one channel will not affect any other "healthy" channels.

In one embodiment, second switching devices 140(*a*)-(*d*) are embodied as VN808™ Octal High-Side Drivers, from STM Microelectronics NV, Geneva, Switzerland, or its functional equivalent. The VN808™ is a monolithic IC that has 8 different channels with protection and diagnostic functions integrated on the chip. Active current limitation is combined with thermal shutdown and automatic restart, which protects the device against overload. In the overload condition, channel turns OFF and back ON automatically so as to maintain junction temperature between a range of temperature values. Each individual switch of VN808™ is independently current limited to between 0.7 A and 1.7 A. There are two levels to this active current limiting. The first level is based on the junction temperature of the individual channel's switch. If the over-current condition causes the junction of the switch associated with that channel to rise above about 175° C. the output will be set to OFF via the hardware logic of the Octal switch and remain OFF until the junction temperature falls to below about 135° C. The channel may also be set to OFF if the Octal device's case temperature reaches about 130° C. In that case, the output will remain OFF until the case temperature falls to about 110° C. The typical behavior is for the channel-based junction temperature rise to dominate the device's decision to open/close the switch (not the case temperature sensing). The channel switches of the Octal device are truly independent such that an over-current condition in one channel will not affect any other "healthy" channels.

The method of fault detection used by the preferred switches 105 and 140($a$)-($d$) is temperature sensing. However, the present invention is not limited to fault detection via temperature sensing, since excessive current can be detected in a non-destructive fashion using a sense resistor, or in a wide variety of other known ways.

Although not shown in FIG. 1, power regulators coupled to the outputs of system 100 can be used to obtain desired voltage levels required for particular output channels. The regulators can be boost (to obtain higher voltages) or buck (to obtain lower voltages).

In a preferred embodiment, as described below, systems according to the present invention preferably also include a CPU, generally a microprocessor-based CPU, having associated firmware that is coupled receive a readback signal representative of the respective outputs, such as outputs 101($a$)-($h$), 102 ($a$)-($h$), 103 ($a$)-($h$), and 104 ($a$)-($h$) shown in FIG. 1. Using the readback signal (and/or the STATUS signal as described below) the CPU can intervene by sending a turn OFF signal (OFF signal to inputs such as 171-178) to disable any one of the respective outputs 101($a$)-($h$), 102 ($a$)-($h$), 103 ($a$)-($h$), and 104 ($a$)-($h$) in response to a determination that a particular output is faulted.

Figure 2:
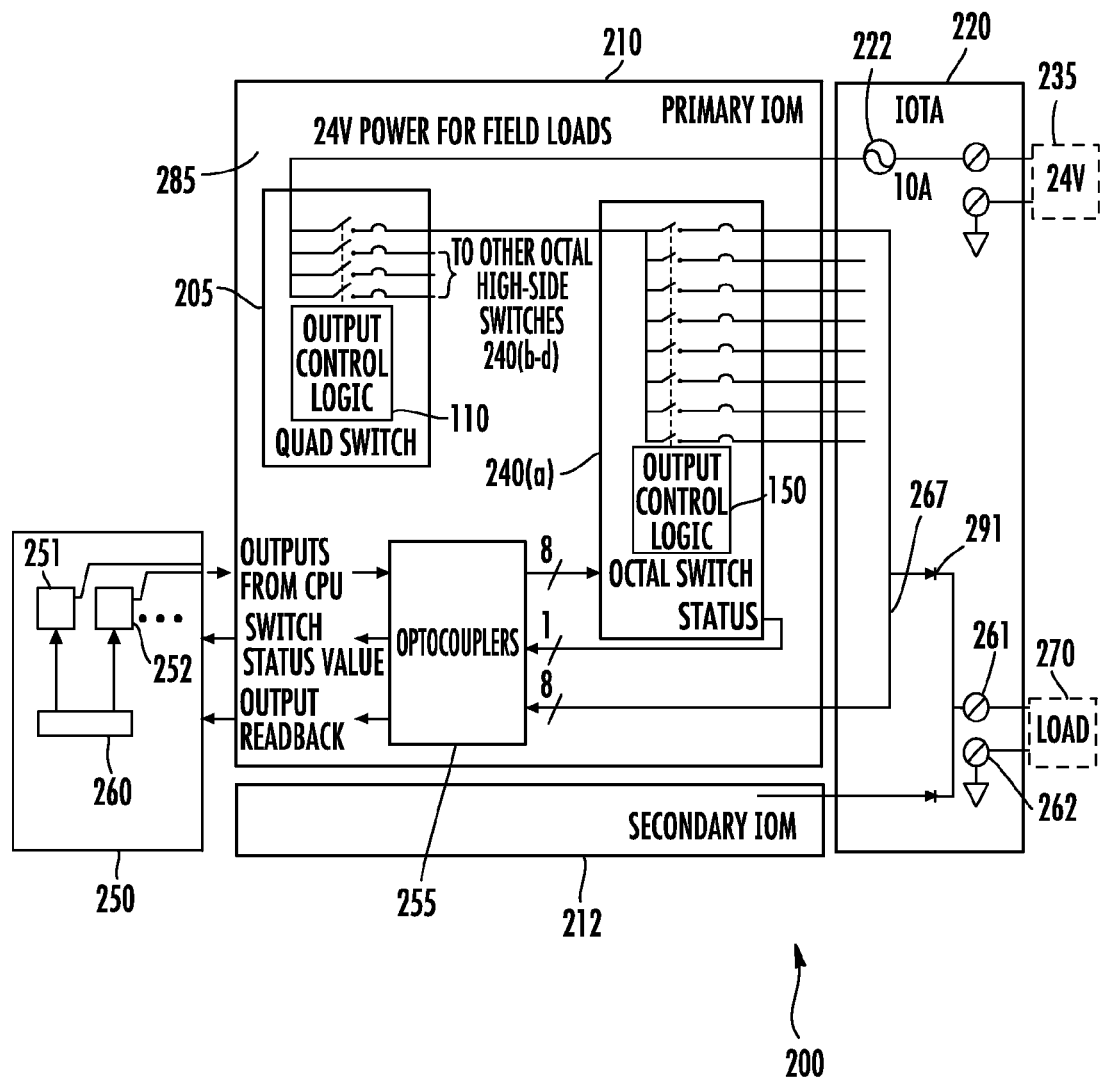
FIG. 2 is a block diagram of an electronic circuit protection system comprising primary DO input/output module (IOM), IOTA and a CPU. An optional second (redundant) IOM is also shown.

FIG. 2 shows an electronic circuit protection system 200 comprising primary DO input/output module (IOM) 210, input/output termination assembly (IOTA) 220 and CPU 250. An optional second IOM 212 for IOM redundancy is also shown. IOTA 220 receives power from a power supply, such as the exemplary 24 volt dc power supply 235, provides the power to primary IOM 210 and secondary IOM 212, receives power from the IOMs, and delivers power supply power to screw terminal 261 (one channel shown) which is shown referenced to a ground screw terminal 262. IOTA 220 includes an optional rectifying diode 291 (or other suitable back-current blocking arrangement) to prevent current diverting from load 270 from reaching partner IOM (210 and 212 and optocoupler 255). IOTA 220 includes an optional conventional series fuse, such as the 10 A fuse 222 shown. The fuse 222 represents a third level protection mechanism. The role of fuse 222 is to protect the other equipment in the cabinet from the IOM 210 and its field wiring. There is only one fuse 220 shown for both a primary IOM 210 and secondary IOM 212. However, multiple fuses can be used.

The exemplary 24 volt supply voltage is thus coupled via IOTA 220 to the power supply input (e.g. Vcc) of first electronic control device 205 (shown as a high side quad switch) on the primary IOM board 210. Although shown as a quad switch in FIG. 2, as noted above, first control device 205 can provide as few as two (2) outputs, three (3) outputs, or more than four (4) outputs. Outputs from quad switch 205 are coupled through four (4) second high-side switches 240($a$)-($d$), shown as octal switches, to the respective loads 270. Although described as being all octal switches, second high side switches 240($a$)-($d$) can each provide different numbers of outputs, the number for each second high side switch ranging from one (1) output, between two (2) and seven (7) outputs, or more than eight (8) outputs. All components of IOM 210 are preferably provided on a common circuit board 285, as shown in FIG. 2.

The present invention is designed for use in an industrial environments. Industrial environments are well known to require good isolation between digital (e.g. CPU) and power supply parts. Optocouplers are widely used and multi-channel optocouplers are commercially available. IOM 210 also includes a suitable isolation device, such as an optocoupler 255, which allows interfacing CPU 250 (which is generally only compatible with low voltage (e.g. 3.3 V) signals) with high voltage outputs provided by respective outputs of octal switches 240($a$)-($d$). Octal switch 240($a$) is shown having a single output indicative of the status of the octal switches 240($a$)-($d$) ("STATUS") which is coupled to CPU 250 via optocoupler 255. The switch STATUS value reflects if any fault condition has been detected for any of the eight channels of that device. There are thus a total of four switch STATUS value signals since there are four octal switches 240($a$)-($d$) shown in FIG. 2. Paths 267 provide output readback from the respective outputs of each octal switch 240($a$)-($d$), which through optocoupler 255 provides digital output readback signals which reach CPU 250. Optocoupler 255 is also shown providing isolation between control signals provided by CPU 250 and the eight (8) control inputs received by each octal switch 240($a$)-($d$).

CPU 250 preferably includes a status resister for each output channel provided by system 200. CPU 250 thus includes 32 status registers (251, 252, . . . ) associated with each of the 32 DO channels supported by system 200. CPU 250 includes embedded firmware 260. Firmware is preferably used since it can be updated without the need for additional hardware, commonly through the use of vendor-provided software. Firmware updates can improve the performance and reliability, even the basic available functionality of a device, and many devices benefit from regular firmware updates. As used herein, the term "firmware" is defined in its commonly accepted definition, that being the programmable content of a hardware device, which can consist of machine language instructions for a processor, or configuration settings for a fixed-function device, gate array or programmable logic device. Firmware can be stored in ROM, non-volatile media such as EEPROM and Flash, or SRAM solutions.

All 32 outputs from octal switches 240($a$)-($d$), except for the final diode 291, are shown in FIG. 2 being read-back from the I/O Termination Assemblies (IOTAs) 220 using paths 267 via optocouplers 255 by CPU 250. The firmware 260 in the CPU 250 compares the output levels vs. intended (e.g. programmed and stored) level values. Programmed reference levels in the firmware 260 for the compare operation for the various channels can be the same or different. If the firmware 260 detects that an output is faulted, it will send a control signal to the faulted input of octal switch 240($a$)-($d$) to turn that output channel OFF. In a preferred embodiment, the faulted channel cannot be turned back ON without operator intervention.

As shown in FIG. 2, CPU 250 drives thirty two (32) signals that reflect the intended binary state of the 32 DOs, using writable storage, such as embedded registers 251, 252, . . . for each of the 32 channels. The ON/OFF state for the respective outputs of octal switches 240(a)-(d) is thus determined by value stored by the firmware in the group of CPU-resident output registers 251, 252, . . . . The outputs of the registers 251, 252, . . . are thus used to drive the optocouplers 255 that subsequently drive the respective control inputs of the octal switches 240(a)-(d) associated with output control logic 150 which supply loads 270. In a typical embodiment, the firmware writes a binary "1" to the appropriate register bit to turn an output "ON" or a "0" to turn an output "OFF". Accordingly, if no fault is detected, all CPU outputs (embedded registers 251, 252 . . . ) are preferably set HIGH. In general, the comparison provide by CPU 250 of the output levels vs. intended (stored) values is the primary method sense an output fault because it is generally detected more quickly than a fault determination via the STATUS indicator from octal switches 240(a)-(d) as described above.

Significantly, without the output control provided by the firmware 260, a faulted output provided by any octal switch 240(a)-(d) could begin to oscillate, which would be generally considered unacceptable operation. In a preferred embodiment, as described above, when the firmware 260 detects that a particular output is faulted, it will turn the particular output OFF so that it can not be turned back ON without operator intervention (e.g. correction of the underlying condition causing the fault). Note that from a hardware point of view, the octal switches 240(a)-(d) will automatically reconnect the output status output (SO) state to the load 270 when the temperature falls. So, it is possible for the octal switch 240 (a)-(d) to cause a shorted output channel to oscillate between OFF and ON indefinitely. However, the excessive current state (e.g. via an over-current temperature rise) is sensed by the CPU 250 via the switch STATUS value signal shown. FOR the VN808™, each of the four devices shown 240(a)-(d) provides a single STATUS signal indicating at least one of its channels is faulted. As noted above, individual channel status is determined the output readback path described above which is operable using paths 267 through optical isolators 255 which is then brought in digital signal form into CPU 250 at the point shown in FIG. 2 as 'Output Readback'. Upon detection of a fault condition based on a miscompare operation performed firmware 260 associated with CPU 250, registers 251, 252 . . . of CPU 250 set the faulted channel's output to OFF from a logical point of view. Thus, when the temperature falls and all channels including a previously faulted channel of octals 240(a)-(d) would otherwise be reconnected to the load, the SO value of the faulted channel remains OFF so oscillating behavior is avoided, while the other channels are reconnected to the loads 270.

System 200 can also optionally alerting the system operator to the existence of the fault(s), such as by providing a blinking light. Once the operator has identified and corrected the source of the fault, the output(s) can be returned to automatic control. Once the output can be turned on successfully, the system alarm can be cleared.

A preferred embodiment of operating exemplary system 200 shown in FIG. 2 will now be described. It should be understood that the embodiment described below is provided for illustrative purposes only and does not in any way define the scope of the invention. In operation, in the event that a fault occurs in any of the 32 channels that causes an octal switch 240(a)-(d) to draw excessive current from its supply (Vcc) input, a level of current limiting is provided by the upstream quad switch 205. Each output of the quad switch provides the 24V power for one of the octal switches 240(a)-(d) and can provide about 7.5 A (5 A minimum) to each Octal switch. By configuration, the maximum output current allowed per octal switch is 4 A (8 channels×0.5 A/channel=4 A), thus providing another level of current limiting. Thus, the preferred quad switch is designed to provide an excess current trip level, such as a minimum of 1 A in excess of the maximum required by each output device. In the unlikely event that the multiple outputs of an octal switch average between 0.625 A and 1.25 A and the current limiting at the outputs has not tripped, the current limiting of the channel of the quad switch supplying that octal group of outputs would trip, thus removing the power from that octal output device and its eight associated channels. However this would be a condition where multiple DO channels were exceeding the specified 0.5 A maximum per channel current.

In a preferred mode of operation of system 200, should any of the DO channels draw more current than permitted by the limit imposed, the IOM hardware's protective mechanism(s) described above provided by quad switch 205 and octal switches 240(a)-(d) will cause that channel to go unpowered. However, as noted above, the firmware 260 will generally first see the output miscompare. The CPU's firmware 260 detects the output miscompare, posts a soft failure for the output miscompare (e.g. visual and audible alarm), detects the overcurrent, and sets the set the SO to OFF (through writing a ZERO to registers 251, 252, . . . associated with faulted channel(s)). After being alerted of the soft failure for the overcurrent posted, the operator can shift the system into manual control mode. Two soft failures are preferably posted, one for output miscompare and one for overcurrent.

Some limited operator intervention is generally required to return the channel to normal operation. Over-current conditions are typically the result of a shorted device or shorted wiring so that fault condition must be corrected before returning to normal operation. The user must generally find and clear the wiring fault or faulty device before attempting to restore the DO channel to on-control. Immediately after the IOM detects the fault and until the DO channel is in set ON again, the DO Channel will be OFF, providing safety to perform the maintenance action. Once the actual fault has been cleared, plant personnel can restore the DO Channel to normal operation by setting the SO while still in Manual or setting mode to Cascade and resuming DO writes (programmatically based on user strategy).

The present invention applies to a wide variety of industrial systems, such as systems including as ON-OFF valves, control relays, and motor starters. Moreover, the present invention applies to any system requiring selective switching of a plurality of digital outputs or power sources that are subject to overcurrent/short circuit fault conditions.

In the preceding description, certain details are set forth in conjunction with the described embodiment of the present invention to provide a sufficient understanding of the invention. One skilled in the art will appreciate, however, that the invention may be practiced without these particular details. Furthermore, one skilled in the art will appreciate that the example embodiments described above do not limit the scope of the present invention and will also understand that various modifications, equivalents, and combinations of the disclosed embodiments and components of such embodiments are within the scope of the present invention.

Moreover, embodiments including fewer than all the components of any of the respective described embodiments may also within the scope of the present invention although not expressly described in detail. Finally, the operation of well known components and/or processes has not been shown or described in detail below to avoid unnecessarily obscuring the present invention.

One skilled in the art will understood that even though various embodiments and advantages of the present Invention have been set forth in the foregoing description, the above disclosure is illustrative only, and changes may be made in detail, and yet remain within the broad principles of the invention. For example, some of the components described above may be implemented using either digital or analog circuitry, or a combination of both, and also, where appropriate may be realized through software executing on suitable processing circuitry. The present invention is to be limited only by the appended claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

The invention claimed is:

1. A multi-level over-current electronic protection system for protecting a plurality of outputs, comprising:
   a first solid state reversibly interruptible electronic switch including first output control logic and a plurality of first controlled output channels controlled by said first control logic, said first switching device being coupled to receive power from at least one power supply selected to power a plurality of loads, said first electronic switch providing said power at its plurality of first output channels under normal operating conditions, wherein said first output control logic is operable for reversibly interrupting said power at any of said first output channels when said current in any of said first output channels exceed limits for said first output channels;
   at least one second solid state reversibly interruptible electronic switch including second control logic and a plurality of second controlled outputs control by said second control logic, a power supply input of said second electronic switch coupled to one of said plurality of first controlled output channels to receive said power, wherein said second controlled outputs are coupled to provide said power to said plurality of loads under normal operating conditions and reversibly interrupting said power for any of said second output channels when current in any of said second output channels exceed limits for said second output channels, and
   an isolation device and CPU having associated firmware coupled to said second output channels and said external inputs of said second switches via said isolation device.

2. The system of claim 1, wherein said second control logic includes an internal control input related to a current level in each of said second output channels.

3. The system of claim 2, wherein said second control logic further comprises external control inputs associated with each of said second output channels.

4. The system of claim 3, wherein said second output channels are independently interruptible.

5. The system of claim 1, wherein said first control logic includes an internal control input related to a current level in each of said first output channels, said first output channels being independently interruptible.

6. The electronic protection system of claim 1, wherein said at least one second switch comprises a plurality of said second switches.

7. The system of claim 1, wherein said isolation device comprises a multi-channel optocoupler.

8. The system of claim 1, wherein said CPU includes a plurality of status registers, wherein one of said plurality of status registers are associated with each of said plurality of second output channels.

9. The system of claim 8, wherein said firmware is operable for monitoring a state of each of said plurality of second output channels, wherein said firmware compares a state of each of said plurality of second controlled outputs to at least one predetermined reference level and causes said status registers to provides a turn off signal to said external inputs of said second switching device to disable any of said second output channels responsive to a determination of a faulted output by said firmware.

10. The electronic protection system of claim 1, wherein said current limits for each of said first output channels is greater than said current limits for groups of said second output channels associated with each of said first output channels.

11. A method of providing multi-level over-current electronic protection to protect a plurality of outputs, comprising the steps of:
   providing an electronic protection system comprising a first solid state reversibly interruptible electronic switch for receiving power from a power supply having first control logic associated with a plurality of first controlled output channels in series with at least one second solid state reversibly interruptible electronic switch having second control logic associated with a plurality of second controlled output channels, wherein a power supply input of said second electronic switch is coupled to one of said plurality of first controlled output channels to receive said power;
   connecting a plurality of field loads to said plurality of second controlled output channels to provide power during operation of said field loads;
   automatically interrupting said power to said loads when current in any of second controlled output channels associated with said loads is above a set limit,
   wherein said system further comprises a CPU having associated firmware, further comprising the steps of:
   feeding back a readback signal from said plurality of second output channels to said CPU;
   determining an over current status in any one of said second output channels using said firmware, and
   causing said second output channel which reached said over current status to remain OFF, said second output channel which reached said over current status remaining OFF until cleared by an operator of said system.

12. The method of claim 11, wherein said first and said second output channels are independently interruptible.

13. The method of claim 11, wherein said CPU includes a plurality of status registers, said firmware determining a state of said registers, wherein one of said plurality of status registers is associated with each of said plurality of second output channels.

14. The method of claim 13, wherein said determining step comprises said firmware comparing a state of each of said plurality of second controlled outputs to at least one predetermined reference level and providing a turn off signal using said registers to external inputs of said second switching device to disable any of said second output channels responsive to a determination of a faulted output by said firmware.

* * * * *

UNITED STATES PATENT AND TRADEMARK OFFICE
CERTIFICATE OF CORRECTION

| | | |
|---|---|---|
| PATENT NO. | : 7,800,875 B2 | Page 1 of 1 |
| APPLICATION NO. | : 11/778296 | |
| DATED | : September 21, 2010 | |
| INVENTOR(S) | : Dustin Flay et al. | |

It is certified that error appears in the above-identified patent and that said Letters Patent is hereby corrected as shown below:

On the title page
Please add Assignee, item [73]

Honeywell International Inc.
101 Columbia Road
P.O. Box 2245
Morristown, New Jersey 07962

Signed and Sealed this
Twenty-sixth Day of July, 2011

David J. Kappos
*Director of the United States Patent and Trademark Office*